(12) United States Patent
Sharon et al.

(10) Patent No.: US 12,444,439 B2
(45) Date of Patent: Oct. 14, 2025

(54) ML ASSISTED DYNAMIC DECODING GEAR SELECTION

(71) Applicant: Sandisk Technologies, Inc., Milpitas, CA (US)

(72) Inventors: Eran Sharon, Rishon Lezion (IL); Ran Zamir, Ramat Gan (IL); Omer Fainzilber, Herzeliya (IL); Idan Alrod, Herzliya (IL)

(73) Assignee: Sandisk Technologies, Inc., Milpitas, CA (US)

( * ) Notice: Subject to any disclaimer, the term of this patent is extended or adjusted under 35 U.S.C. 154(b) by 24 days.

(21) Appl. No.: 18/359,147

(22) Filed: Jul. 26, 2023

(65) Prior Publication Data

US 2024/0249749 A1    Jul. 25, 2024

Related U.S. Application Data

(60) Provisional application No. 63/481,056, filed on Jan. 23, 2023.

(51) Int. Cl.
*G11B 20/10* (2006.01)
*G11B 20/18* (2006.01)

(52) U.S. Cl.
CPC ...... *G11B 20/1037* (2013.01); *G11B 20/1833* (2013.01); *G11B 2020/185* (2013.01)

(58) Field of Classification Search
CPC ............ G11B 20/1037; G11B 20/1883; G11B 2020/185
See application file for complete search history.

(56) References Cited

U.S. PATENT DOCUMENTS

| 9,294,132 B1 | 3/2016 | Peleato-Inarrea et al. |
| 2012/0324317 A1* | 12/2012 | Sripathi ................ H04L 1/0054 |
| | | 714/795 |
| 2018/0175882 A1* | 6/2018 | Hanham ............ H03M 13/1111 |
| 2019/0045205 A1* | 2/2019 | Henry ................... H04N 19/136 |
| 2019/0097656 A1* | 3/2019 | Bhatia ................ H03M 13/1117 |
| 2019/0288707 A1* | 9/2019 | Kumar .................. G06F 3/0658 |

(Continued)

FOREIGN PATENT DOCUMENTS

| JP | 2007207325 A | 8/2007 |
| JP | 2019057055 A | 4/2019 |

(Continued)

*Primary Examiner* — Guerrier Merant
*Assistant Examiner* — Jeffrey Andrew Yang
(74) *Attorney, Agent, or Firm* — Patterson + Sheridan, LLP

(57) ABSTRACT

A multi-gear ECC decoder includes a high power decoder and a low power decoder. In order to significantly reduce the decoding time for high-BER codewords using a slow high power decoder, rather than decoding codewords in either slow high power or fast low power, a controller switches between slow high power decoding and fast low power decoding during the decoding process. The controller first will determine, based on a predetermined factor, whether to start decoding in slow high power or fast low power. Once a decoding power is determined, then the decoding will begin. During the decoding process the decoding transitions from a first power lever decoder to a second power level decoder. The decoding will continue in the second decoding power level after the transition, until the decoding is completed or if another switch needs to occur for insufficient decoding.

19 Claims, 13 Drawing Sheets

(56) References Cited

U.S. PATENT DOCUMENTS

| | | |
|---|---|---|
| 2019/0288713 A1 | 9/2019 | Kumar et al. |
| 2021/0135688 A1 | 5/2021 | Zamir et al. |
| 2021/0158169 A1 | 5/2021 | Kim et al. |
| 2021/0225426 A1* | 7/2021 | Moon ................. G11C 11/4072 |
| 2022/0006473 A1* | 1/2022 | Gad .................. H03M 13/3707 |
| 2022/0116057 A1* | 4/2022 | Doubchak .......... H03M 13/1108 |
| 2023/0153198 A1* | 5/2023 | Huang .................. G06F 3/0679 |
| | | 714/723 |
| 2024/0112039 A1* | 4/2024 | Yang ...................... G06N 3/084 |

FOREIGN PATENT DOCUMENTS

| | | |
|---|---|---|
| JP | 2020202553 A | 12/2020 |
| JP | 2022075487 A | 5/2022 |
| WO | 2021106514 A1 | 6/2021 |

\* cited by examiner

ML ASSISTED DYNAMIC DECODING GEAR SELECTION

CROSS-REFERENCE TO RELATED APPLICATIONS

This application claims benefit of U.S. provisional patent application Ser. No. 63/481,056, filed Jan. 23, 2023, which is herein incorporated by reference.

BACKGROUND OF THE DISCLOSURE

Field of the Disclosure

Embodiments of the present disclosure generally relates to a multi-gear error correction code (ECC) decoder using a fast low power decoder and a slow high power decoder.

Description of the Related Art

The multi-gear ECC decoder approach is a tried and proven decoding technique that is used in many flash storage ECC solutions. The cost and power efficiencies compared to a single gear decoder are tremendous. However, the downside of this approach is that for rarer high-bit error rate (BER) decoding operations, the decoding is performed on the stronger but slower decoding gears. The fast low power decoder can process a higher number of messages per clock (the slow high power decoder parallelism may be designed in order to maintain the same active power across decoding gears and an overall low cost solution). The lower parallelism of the stronger decoding gears degrades the mean throughput and may cause issues in read performance. In the multi-gear ECC decoder, several gears or modes or separate cores with different algorithms, accuracies, clock frequencies, parallelism are used to handle the decoding operations.

Usually, the low-cost/low-power decoder is fast and used to decode codewords with lower BER and the high cost/high power decoder is used to decode codewords with high BER. The fast low power decoder and the slow high power decoder can also be used in cascade. The first decoder decodes everything and the second decoder decodes the codewords that failed the first decoding attempt. It is important to note that typically, the fast low-power decoder has a high parallelism (can compute many messages per clock) while the slow high power decoder has low parallelism as the cost and power consumption is high.

In typical operation, the initial decoder is used for the entire decoding operation and is selected based upon syndrome weight (SW) as the SW is calculated at the beginning of the decoding operation, but is costly to recalculate and track. The decoder used does change when the lower power decoder is not sufficient to decode the data and hence, a higher power decoder is needed. In such a situation, the decoder is switched from the lower power decoder to the higher power decoder, but such a situation only increases the decoding latency.

Therefore, there is a need in the art for reducing the decoding latency of slow high power decoding.

SUMMARY OF THE DISCLOSURE

The present disclosure generally relates to significantly reducing the decoding time for codewords using a slow high power decoder. Rather than decoding codewords in either slow high power or fast low power, the disclosure suggests switching between slow high power decoding and fast low power decoding during the decoding process or performing fast low power decoding after slow high power decoding to reduce the decoding latency. The controller will first determine, based on a predetermined factor, whether to start in slow high power for decoding or fast low power for decoding. Once a decoding power is determined, then the decoding will begin. During the decoding process the decoding reaches a transitions from a first power lever decoder which will switch to a second power level decoder. The decoding will continue in the second decoding power level after the transition, until the decoding is completed or if another switch needs to occur for insufficient decoding.

In one embodiment, a controller comprises: a first decoder, wherein the first decoder operates at a first power efficiency level; a second decoder, wherein the second decoder operates at a second power efficiency level below the first power efficiency level; and a decoder manager coupled to the first decoder and the second decoder, wherein the decoder manager is configured to: direct encoded data to the first decoder for decoding; detect a point in the decoding where the data is sufficiently decoded to be able to be decoded by the second decoder; and direct the sufficiently decoded data to the second decoder.

In another embodiment, a controller comprises: a first decoder that operates at a first decoding level; a second decoder that operates at a second decoding level below the first level; and a decoder manager coupled to the first decoder and the second decoder, wherein the decoder manager is configured to: direct encoded data to the first decoder for partially decoding the data; and direct the partially decoded data to the second decoder. Exemplary factors that may distinguish the two decoders include power, decoding algorithm, speed (parallelism), clock frequency, silicon area, and/or combinations thereof.

In another embodiment, a controller comprises: first means to decode data at a first power efficiency level; second means to decode data at a second power efficiency level below the first power efficiency level; and a decoding manager coupled to the first means to decode data and the second means to decode data, wherein the decoding manager is configured to: obtain first decoding information from simulating decoding data in the first means to decode data; obtain second decoding information from simulating decoding data in the second means to decode data; deliver the first decoding information and the second decoding information to a classifier; and create classifier weight and bias based upon the delivering.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to significantly reducing the decoding time for high-BER codewords using a slow high power decoder. Rather than decoding codewords in either slow high power or fast low power, the disclosure suggests switching between slow high power decoding and fast low power decoding during the decoding process. The controller will first determine, based on a predetermined factor, whether to start in slow high power for decoding or fast low power for decoding. Once a decoding power is determined, then the decoding will begin. During the decoding process the decoding transitions from a first power level decoder which will switch to a second power level decoder. The decoding will continue in the second decoding power level after the transition, until the decoding is completed or if another switch needs to occur for insufficient decoding.

Figure 1:
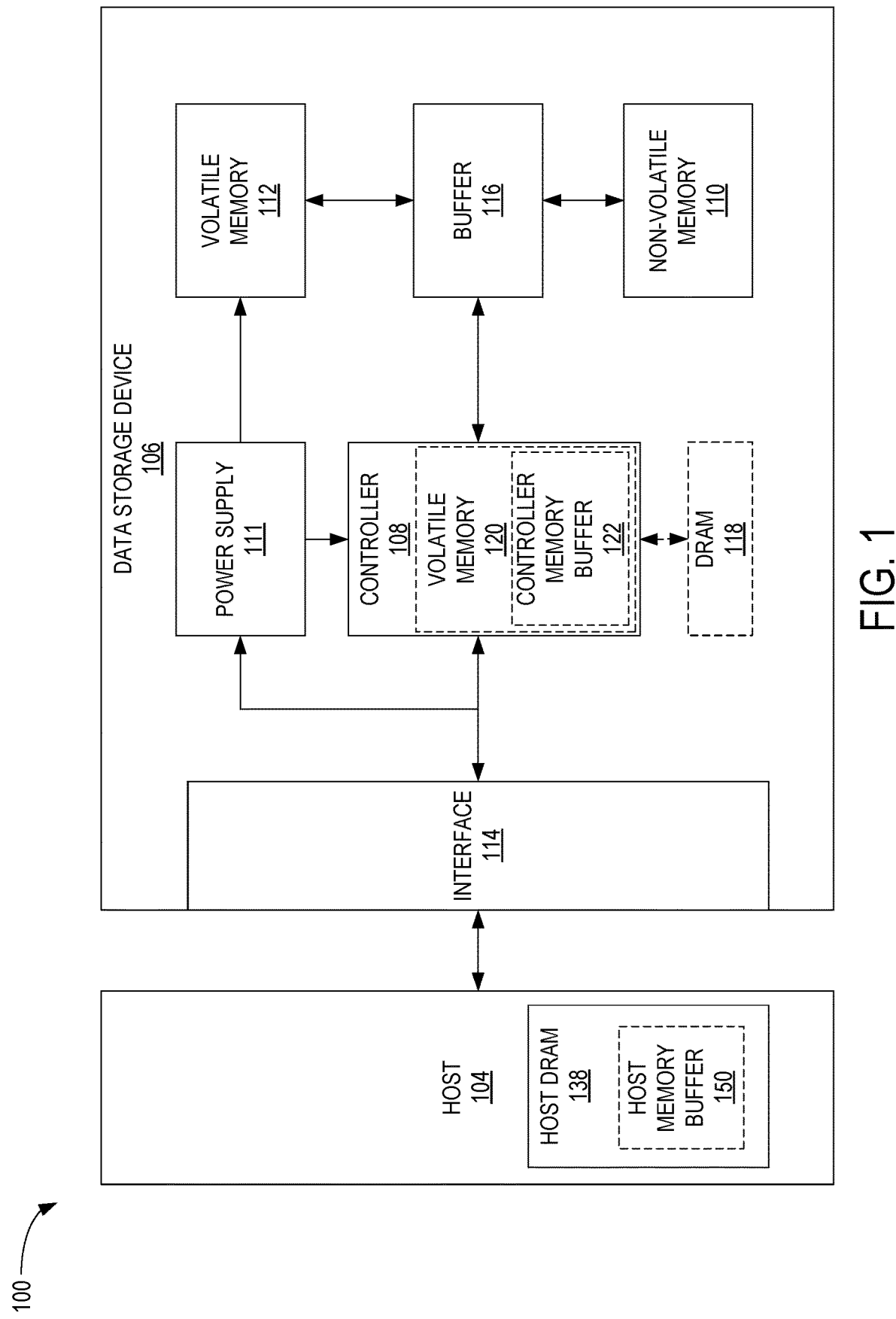
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
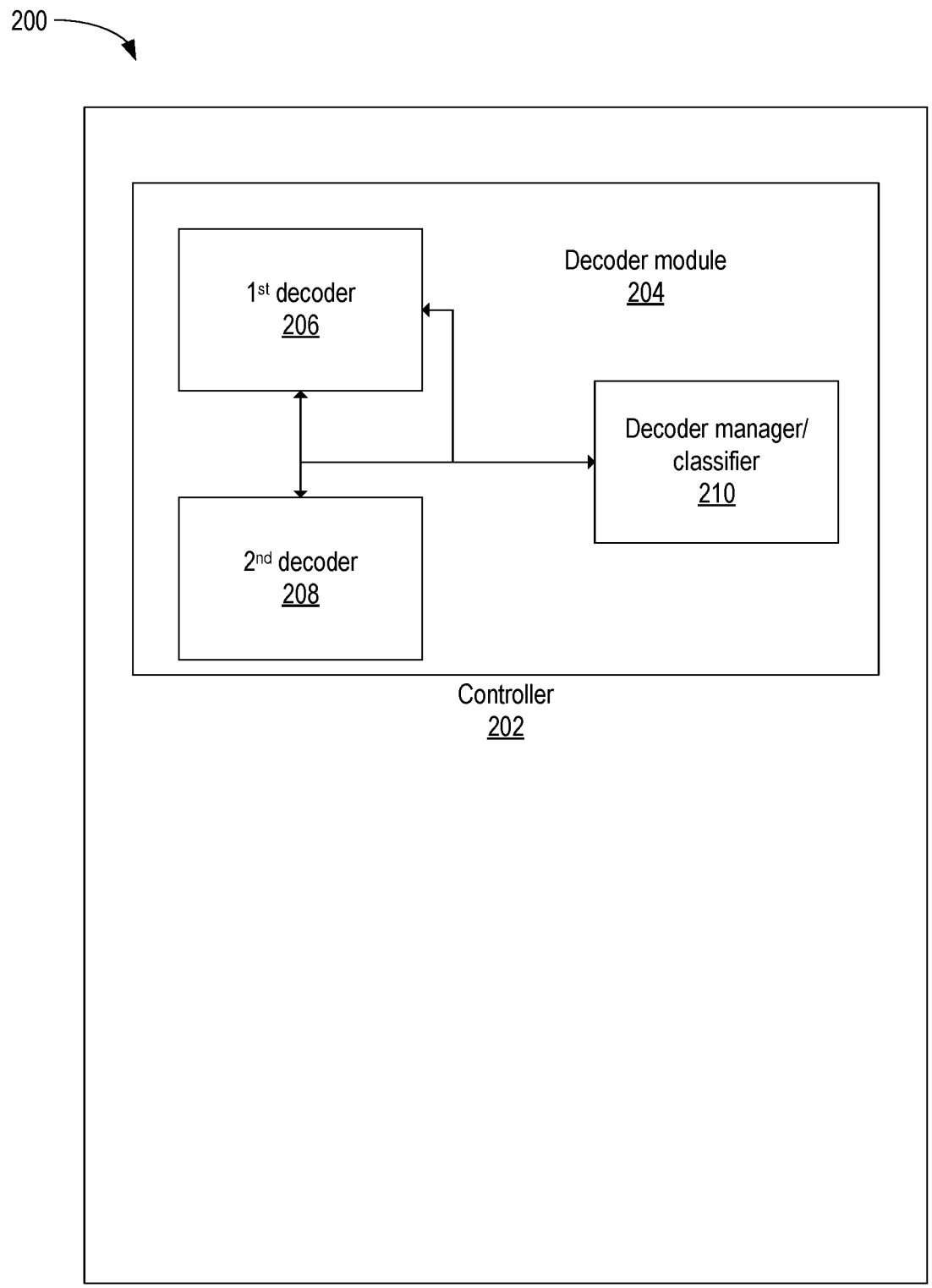
FIG. 2 is a schematic block diagram illustrating a storage system, according to certain embodiments.

FIG. 2 is a schematic block diagram illustrating a storage system 200, according to certain embodiments. The storage system 200 includes a controller 202 that comprises a decoder module 204. The decoder module 204 comprises a first decoder 206, a second decoder 208, and a decoder manager/classifier 210. The first decoder 206, the second decoder 208, and the decoder manager/classifier 210 are all connected. Though only a first decoder 206 and a second decoder 208 are shown, it is to be understood that there can be more than two decoders.

Figure 3:
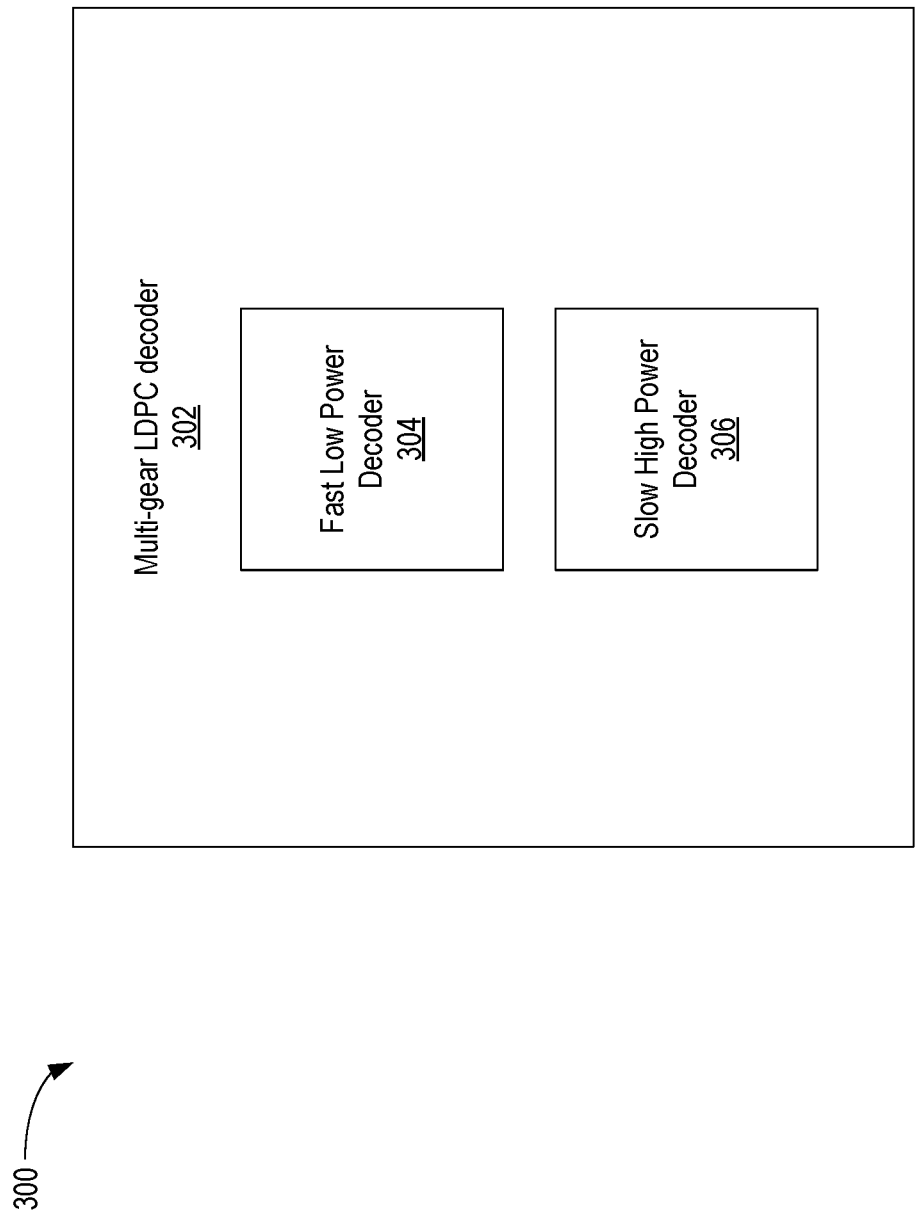
FIG. 3 is a schematic block illustrating multi-gear low-density parity-check (LDPC) decoder, according to certain embodiments.

FIG. 3 is a schematic block 300 illustrating multi-gear low-density parity-check (LDPC) decoder 302, according to certain embodiments. The multi-gear LDPC decoder 302 comprises a fast low power decoder 304 and a slow high power decoder 306. The LDPC decoder 302, the fast low power decoder 304, and the slow high power decoder 306 are exemplary and may be used in other decoding algorithms. The fast low power decoder 304 uses a simple bit flipping algorithm and can handle simple calculations. The fast low power decoder 304 has a low memory size and low bandwidth (BW). The fast low power decoder 304 has a high parallelism (GB/sec) and is very power efficient (mW/GB/sec). The fast low power decoder is very cost efficient (mm$^2$/GB/sec) and has reduced correction capabilities.

The slow high power decoder 306 uses a belief-propagation algorithm (optimal iterative algorithm) and can handle complex calculations. The slow high power decoder 306 has a high memory size and high BW. The slow high power decoder 306 has a low parallelism about 100 MB/sec and less power efficient (mW/GB/sec) than the fast low power decoder 304. The slow high power decoder 306 is less cost efficient (mm$^2$/GB/sec) than the fast low power decoder 304 and has increased correction capabilities. It is to be understood that the algorithm is merely an example and that other decoding algorithms are contemplated.

Figure 4:
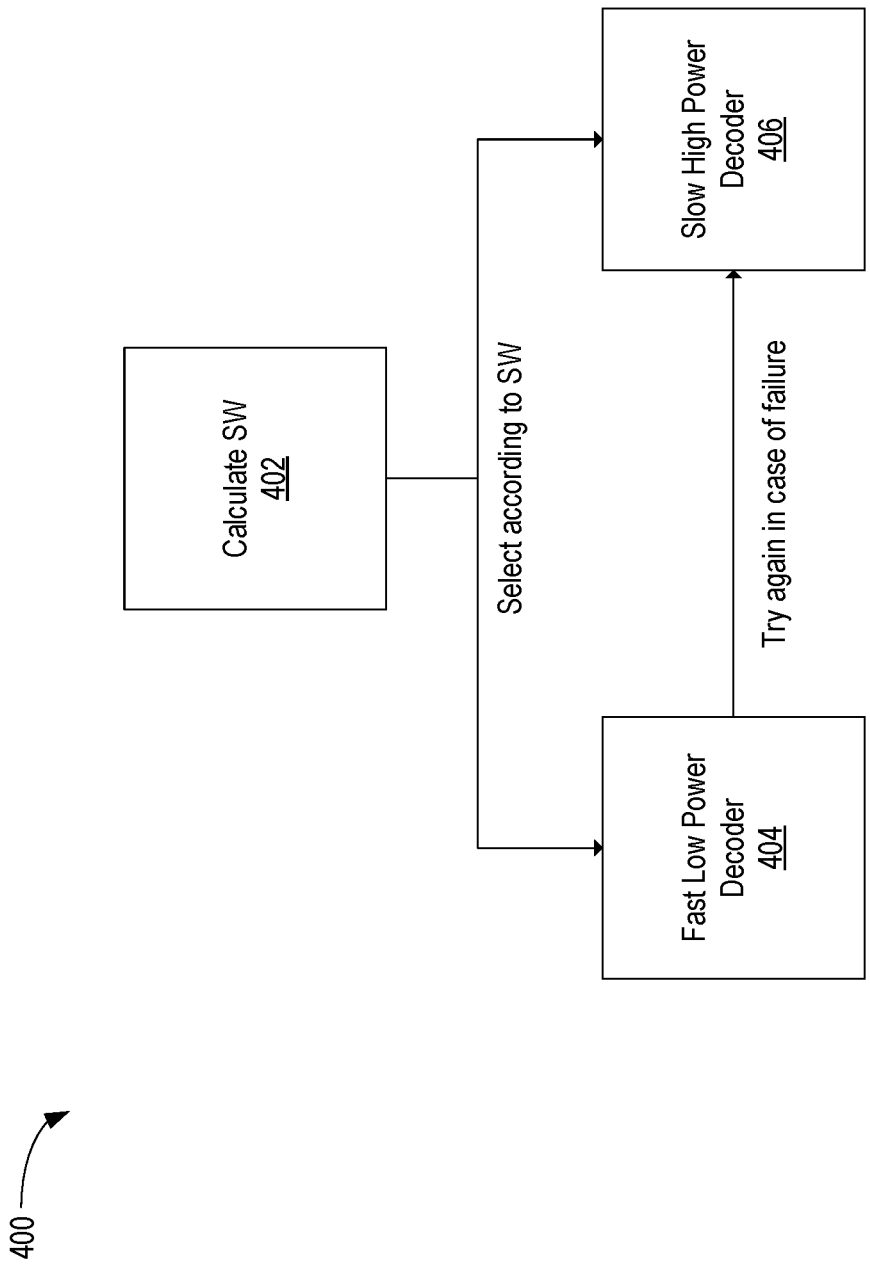
FIG. 4 is a flow chart illustrating a method for an initial decoding gear selection, according to certain embodiments.

FIG. 4 is a flow chart illustrating a method 400 for an initial decoding gear selection, according to certain embodiments. Previous systems have initial gear selection according to the syndrome weight (SW). As the SW is calculated at the beginning of the decoding, the SW is costly to recalculate or keep track of. In previous systems, the decoding gear transitions were always from the weaker/faster gears to the stronger/slower gears.

The method 400 begins at block 402. At block 402, the controller, such as the controller 202 of FIG. 2, calculates the SW. SW is the number if unsatisfied parity check equations in the codeword. Based on the SW calculated at block 402, the method 400 will proceed to either block 404 or block 406. The method 400 will proceed to block 404 from block 402 if the controller calculates the SW to be low. The method 400 will proceed to block 406 from block 402 if the controller calculates the SW is high. At block 404, the controller will use the fast low power decoder. The controller will try again to use the fast low power decoder in case of failure. If there is a failure the method 400 will proceed to block 406. At block 406, the system will use the slow high power decoder.

Figure 5:
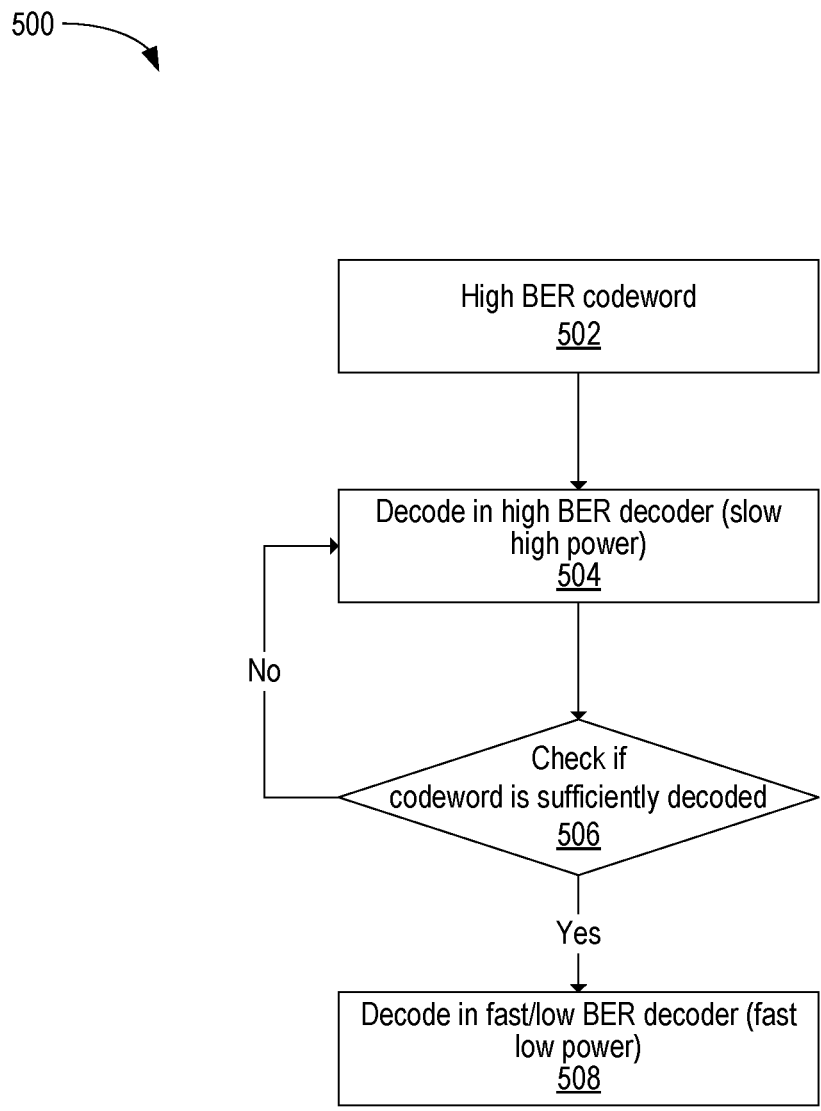
FIG. 5 is a flow chart illustrating a method for switching a decoding gear, according to certain embodiments.

FIG. 5 is a flow chart illustrating a method 500 for switching a decoding gear, according to certain embodiments. The method 500 dynamically switches the decoding gear according to the decoding status. Mainly, for codewords decoded in the slow high power decoder (second decoder), the codeword is decoded sufficiently and is transferred (potentially back) to the (much) faster and more efficient decoder (fast low power).

The method 500 begins at block 502. At block 502, the controller, such as the controller 202 of FIG. 2, selects a high BER codeword. At block 504, the system decodes using the high BER decoder (slow high power). At block 506 the controller determines whether the codeword is sufficiently decoded. If the controller determines the codeword to not be sufficiently decoded then the method 500 returns to block 504 to continue the decoding process. The point where the codeword is sufficiently decoded is the inflection point where the lower power decoder will succeed with a high probability. If the controller determines the codeword to be sufficiently decoded then the method 500 proceeds to block 508. At block 508, the controller decodes in fast/low BER decoder (fast low power).

Figure 6:
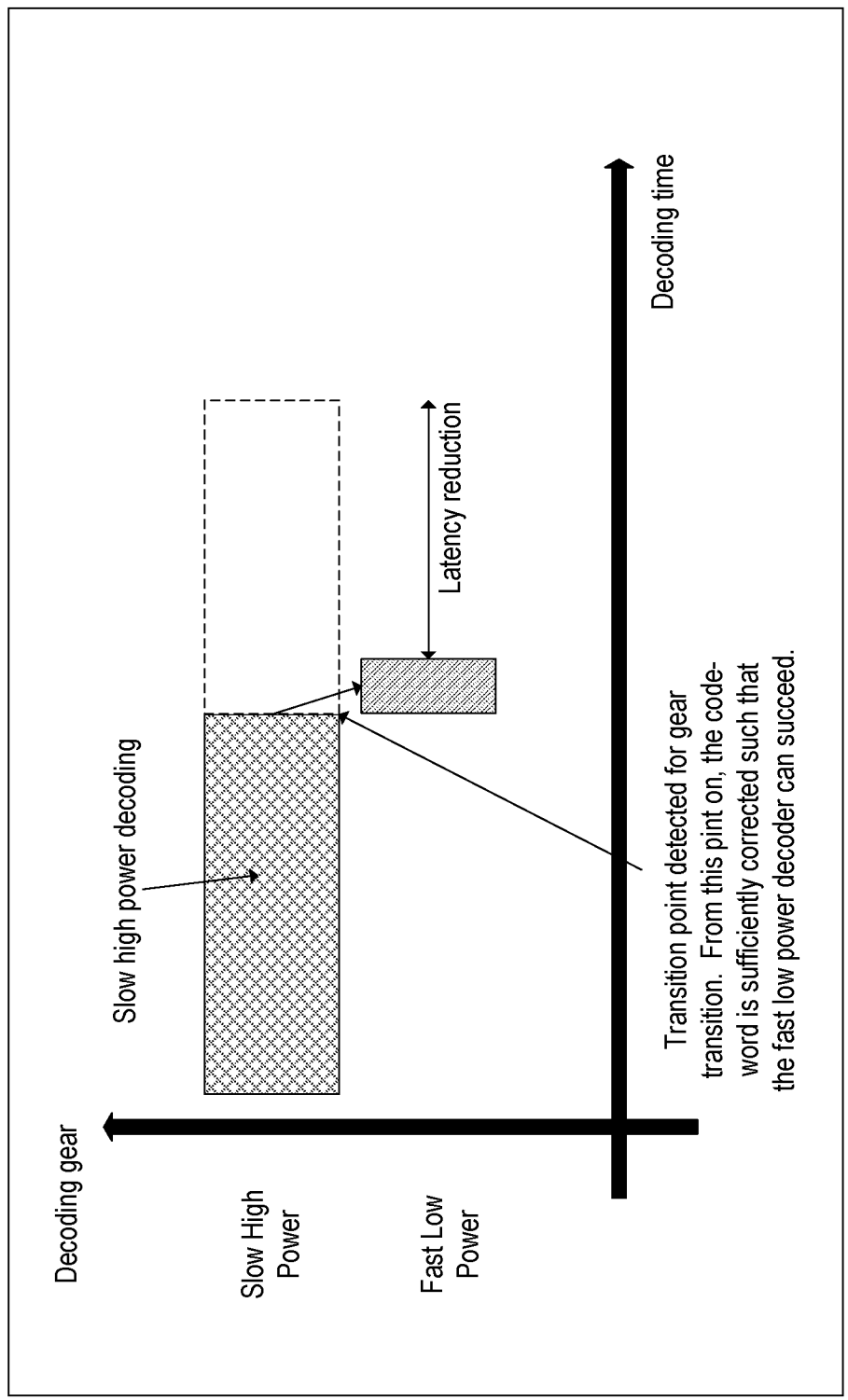
FIG. 6 is a schematic graph of decoding a gear transition, according to certain embodiments.

FIG. 6 is a schematic graph 600 of decoding a gear transition, according to certain embodiments. The graph 600 has an x-axis of the decoding time and a y-axis of the decoding gears. During slow high power decoding there is a transition point detected for gear transition. At the transition point the code-word is sufficiently corrected such that the fast low power decoder can succeed. The fast low power decoder is much more power efficient than the slow high power decoder. The fast low power decoder works faster than the slow high power decoder in reference to decoding time. As such, at the inflection/transition point, the controller can switch to the fast low power decoder form the slow high power decoder and still successfully decode, but at a much faster rate and lower power usage. The dashed lines indicate the potential time taken for the slow high power decoder to complete the decoding operation.

For the decoding to work well, the inflection/transition point identification will be valuable to avoid false transitions to the fast low power from the slow high power, transitions where the fast low power decoding fails. If the fast low power fails, then the decoding must be done again at the slow high power decoder (potentially from scratch) or start a recovery flow. Either options adds a significant latency penalty. Therefore, avoiding false transitions will be advantageous.

Figure 7:
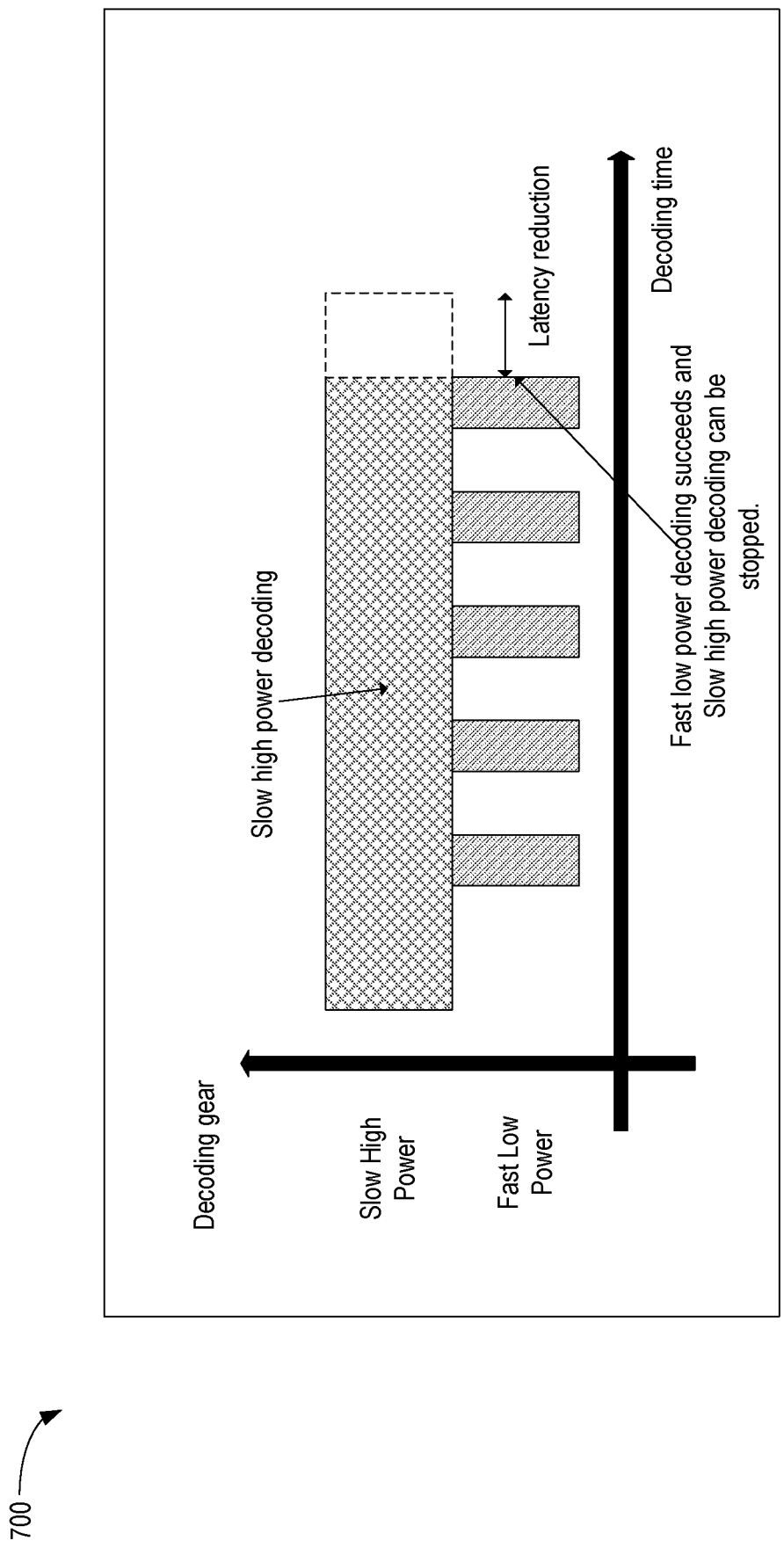
FIG. 7 is a schematic graph of an opportunistic transition, according to certain embodiments.

FIG. 7 is a schematic graph 700 of an opportunistic transition, according to certain embodiments. The graph 700 has an x-axis of the decoding time and a y-axis of the decoding gears. During an opportunistic transition the codeword is decoded after fixed intervals of time while continuing to decode in FP (or pausing decoding). Once the fast low power decoding succeeds the slow high power decoding can be stopped. With the opportunistic transition, there is some latency reduction, but can be wasteful due to multiple attempts that use more power. As such, FIG. 7 shows an approach that has some gains over never switching, but may not be as power efficient as possible due to the additional failed decoding operations that are performed along the way.

Figure 8:
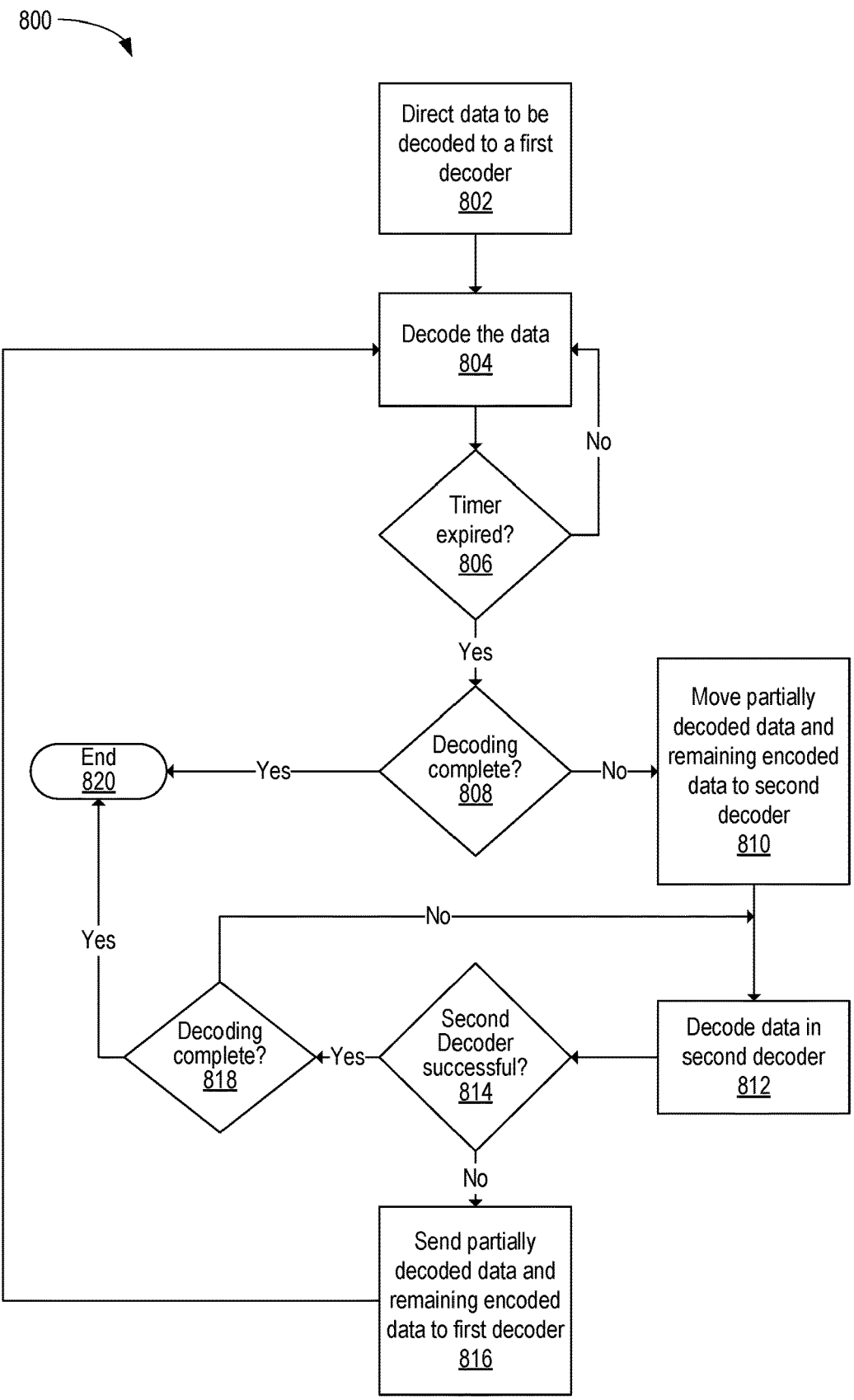
FIG. 8 is a flow chart illustrating a method for decoding transitions, according to certain embodiments.

FIG. 8 is a flow chart illustrating a method 800 for decoding transitions, according to certain embodiments. The method 800 may also be used in the opportunistic method such as method 700. The method 800 begins at block 802. At block 802, the controller such as the controller 202 of FIG. 2 directs data to be decoded to a first decoder such as the first decoder 206 of FIG. 2. At block 804, the first decoder decodes the data. At block 806, the controller determines whether a timer has expired. If the controller determines that the timer has not expired then the method 800 returns to block 804. If the controller determines that the time has expired then the method 800 proceeds to block 808. At block 808, the controller determines whether the decoding is complete. If the controller determines the decoding is complete then the method 800 proceeds to block 820 where the method 800 ends. If the controller determines the decoding is not complete then the method 800 proceeds to block 810. At block 810, the controller moves the partially decoded data and the remaining encoded data to a second decoder such as the second decoder 208 of FIG. 2. At block 812, the controller decodes the data in the second decoder. At block 814, the controller determines whether the second decoder is successful. If the controller determines the second decoder is successful, then the method 800 proceeds to block 818. If the controller determines the second decoder is not successful, then the method 800 proceeds to block 816. At block 816, the controller sends the partially decoded data and remaining encoded data to the first decoder at block 804. At block 818, the controller determines whether the decoding is complete. If the controller determines the decoding is complete, then the method 800 proceeds to block 820 where the method 800 ends. If the controller determines the decoding is not complete, then the method 800 returns to block 812.

Figure 9:
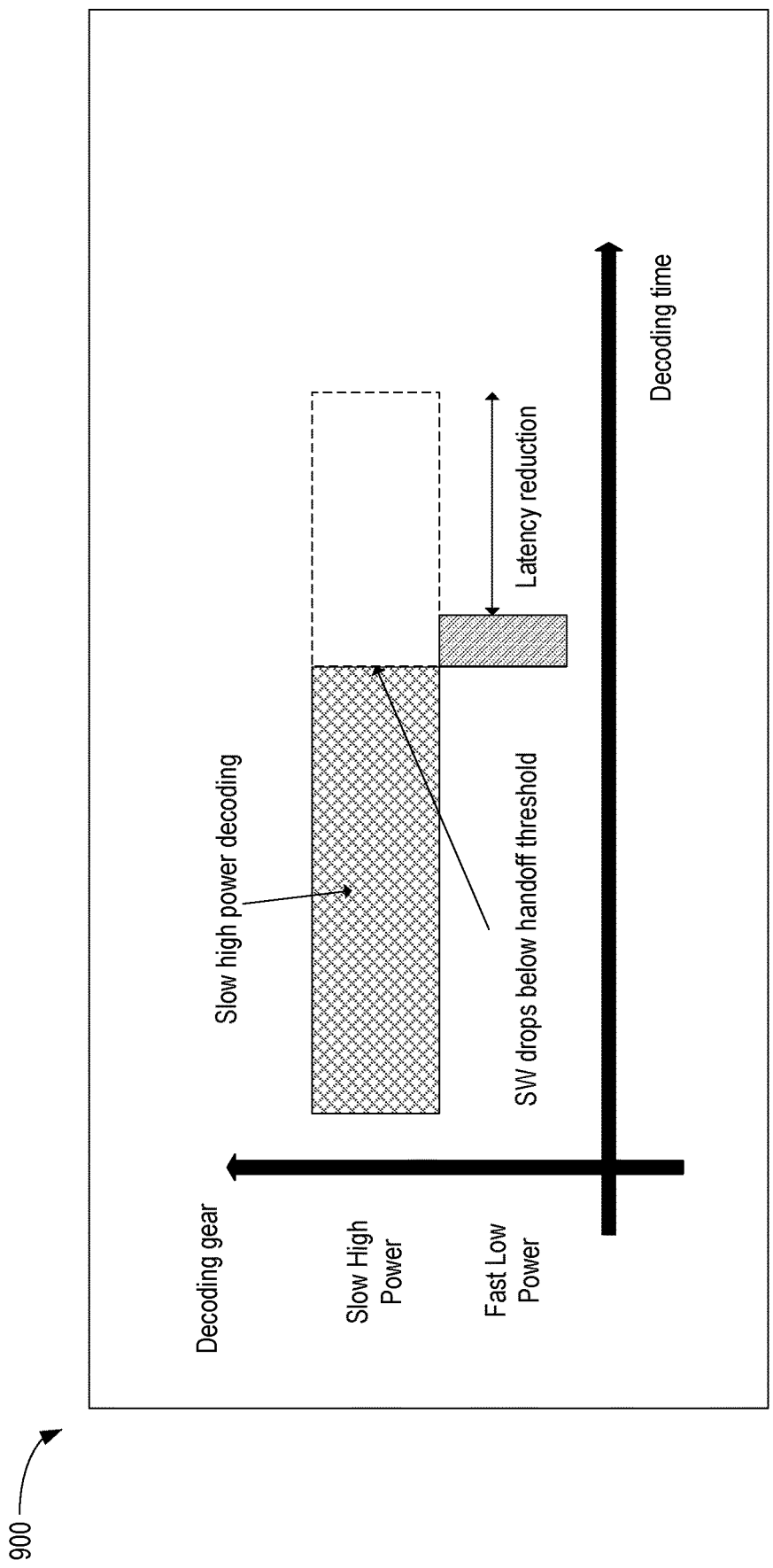
FIG. 9 is a schematic graph of a syndrome weight (SW) based transition, according to certain embodiments.

FIG. 9 is a schematic graph 900 of a SW based transition, according to certain embodiments. The graph 900 has an x-axis of the decoding time and a y-axis of the decoding gears. The SW based transition identifies a transition point by comparing the SW to a threshold. The SW is checked periodically during the slow high power decoding. The SW is a proxy for the BER. Once the SW is below a threshold the decoding transitions from the slow high power decoding to the fast low power decoding. The threshold can be calibrated offline to ensure the best performance while avoiding false transitions. The offline calibration of the threshold may set the threshold to avoid transitions to the fast low power decoding that may fail. When the SW drops below a handoff threshold slow high power decoding transitions to the fast low power decoding from the slow high power decoding. The SW transition leads to increased latency reduction compared to the latency reduction of the opportunistic transition seen in graph 700. The downside is that SW based transition requires a circuit for tracking the SW during decoding. The cost and power of the SW tracking may still be lower compared to the latency reduction achieved by using the current methods.

Figure 10:
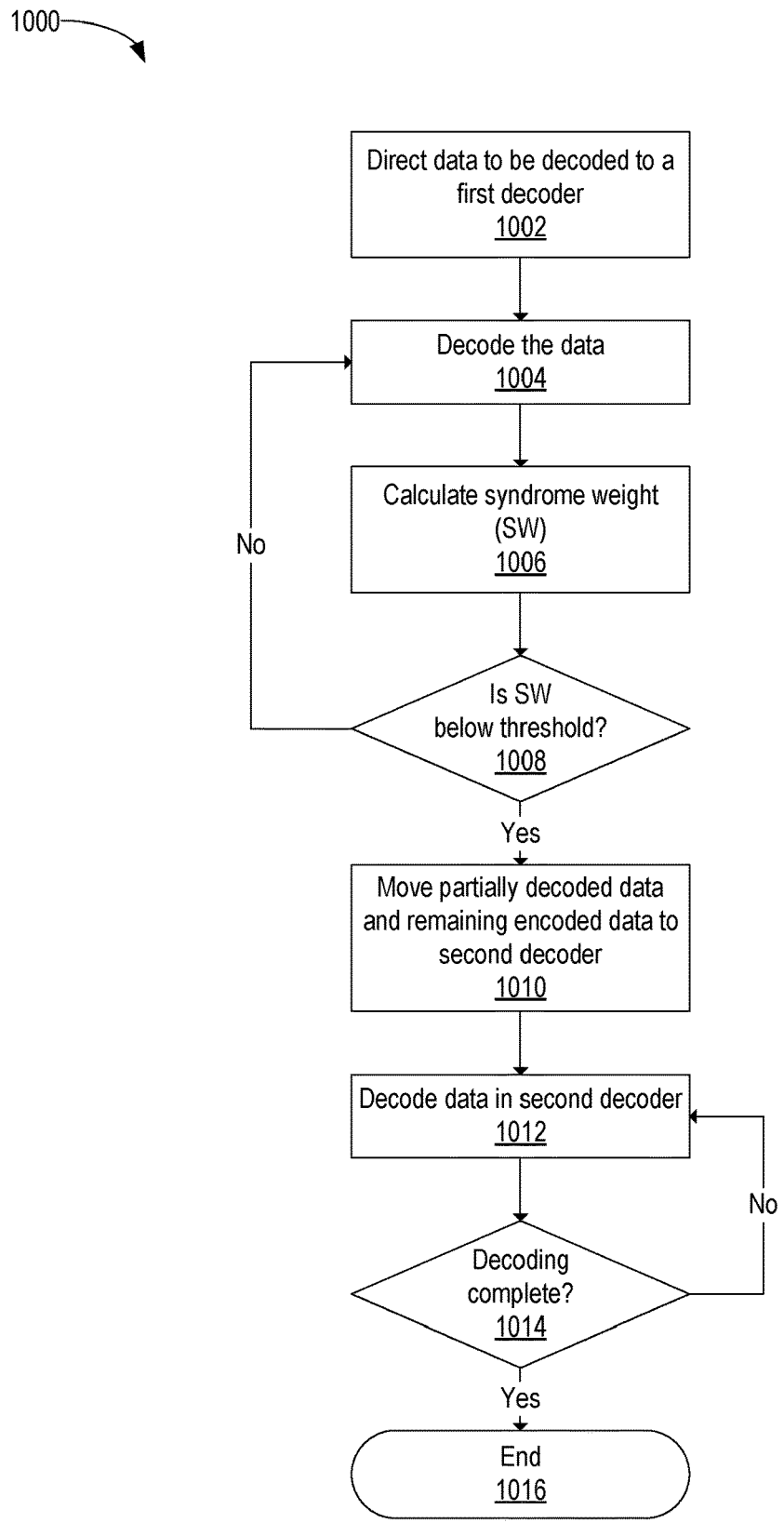
FIG. 10 is a flow chart illustrating a method for a SW based transition, according to certain embodiments.

FIG. 10 is a flow chart illustrating a method 1000 for a SW based transition, according to certain embodiments. The method 1000 identifies a transition point by comparing the SW to a threshold. Once the BER is low enough the decoding transitions from the slow high power decoding to the fast low power decoding.

The method 1000 begins at block 1002. At block 1002, the controller, such as the controller 202 of FIG. 2, directs data to be decoded to a first decoder such as the first decoder 206 of FIG. 2. At block 1004, the first decoder decodes the data. At block 1006, the controller calculates the SW. Calculating the SW may also be done in parallel to the decoding. At block 1008, the controller determines whether the SW is below a threshold. If the controller determines that the SW is not below the threshold, then the method 1000 returns to block 1004. If the controller determines the SW to be above the threshold, then the method 1000 proceeds to block 1010. At block 1010, the controller moves the partially decoded data and remaining encoded data to a second decoder, such as the second decoder 208 of FIG. 2. At block 1012, the controller decodes the data in the second decoder. At block 1014, the controller determines whether the decoding is complete. If the controller determines that the decoding is not complete, then the method 1000 returns to block 1012. If the controller determines that the decoding is complete, then the method 1000 proceeds to block 1016 where the method 1000 ends.

Figure 11:
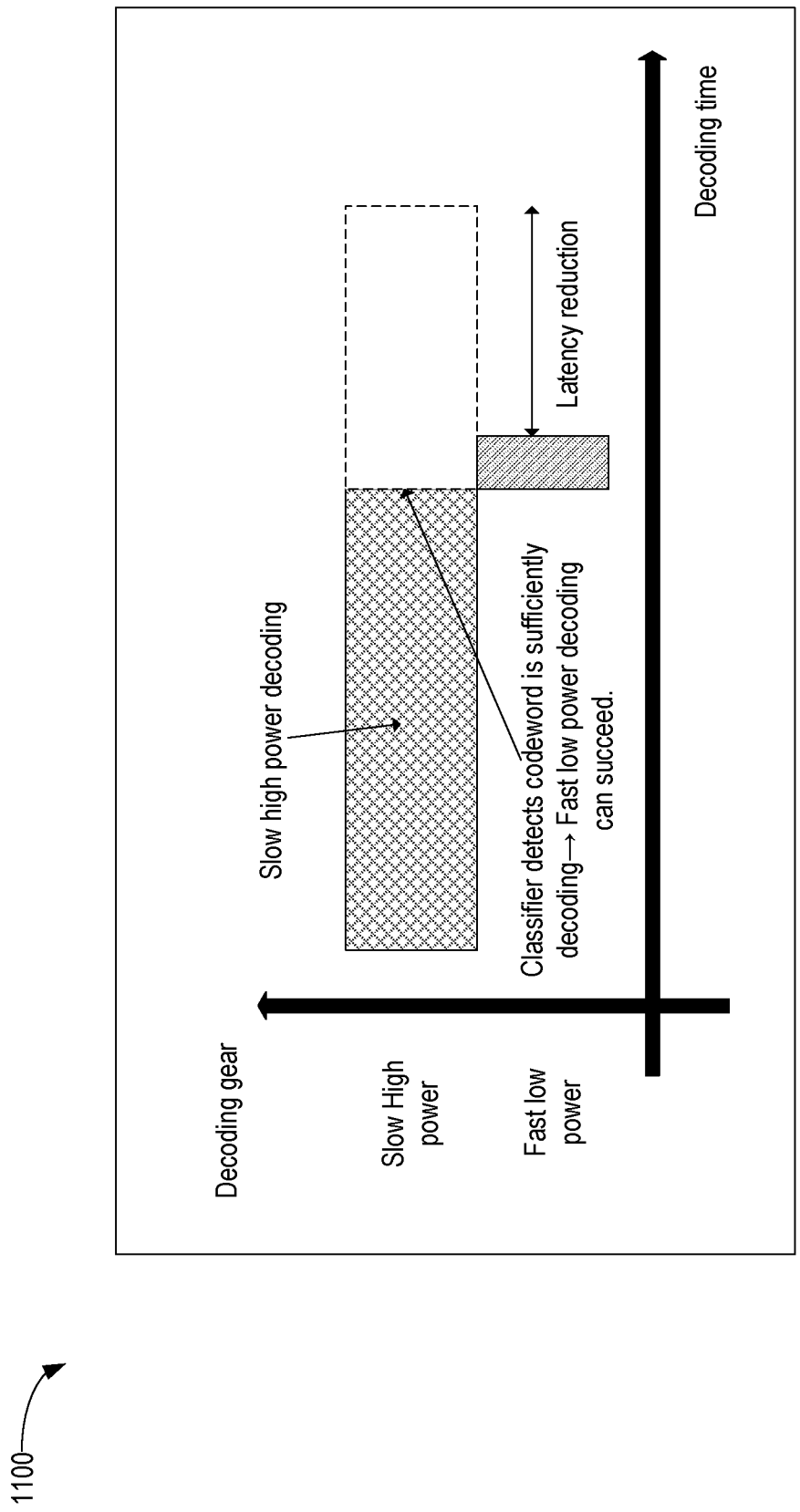
FIG. 11 is a schematic graph of a machine learning (ML) based transition, according to certain embodiments.

FIG. 11 is a schematic illustration of a machine learning (ML) based transition 1100, according to certain embodiments. The graph 1100 has an x-axis of the decoding time and a y-axis of the decoding gears that illustrates using an ML classifier trained to detect a point in the slow high power decoding when the code-word is sufficiently decoded such that a transition from slow high power decoding to the fast low power decoding. Sufficiently decoded is defined by having a high probability for the fast low power decoding to succeed from this point on. The ML classifier may be trained using readily available features (generated as a byproduct of the decoding process) and may be implemented via a low complexity inference function. The ML based transition 1100 is preferred to the SW based transition approach as does not require tracking of the SW, which may lead to a solution with lower cost and reduced power consumption.

The implemented classifiers may be low complexity inference functions (such as Linear support vector machine (SVM) and simple tree based models) to ensure low ASIC gate count and good power performance. Furthermore, simple features that are either available during the decoding operation (as a byproducts of decoding) or are easy (low complexity and power) to extract are used in ML transitions.

Examples of the simple features used include the number of unsatisfied parity-checks encountered in different backward-looking windows: ($\frac{1}{8}$, $\frac{2}{8}$, ..., 1) iterations backward. Additional features are the number of bit flips flipped by the decoder in the same backward-looking windows. Also, the number of log likelihood ratios (LLRs) whose magnitude exceeds a threshold. Other LLR statistics include, but not limited to, the number of bits with LLR magnitude below/above a certain value, the average LLR magnitude, LLR magnitude STD, etc. Additionally, the above bit related features can be separated and counted according to the degree of bits. The degree of bits refers to how many parity-check equations is a bit participating in. For example according to the bit degrees such as separate statistics for bits participating in 3 parity-checks (=degree-3 bits) or bits participating in 4 parity-checks (=degree-4 bits). It is to be understood that the simple features are exemplary and other simple features may be used.

Figure 12:
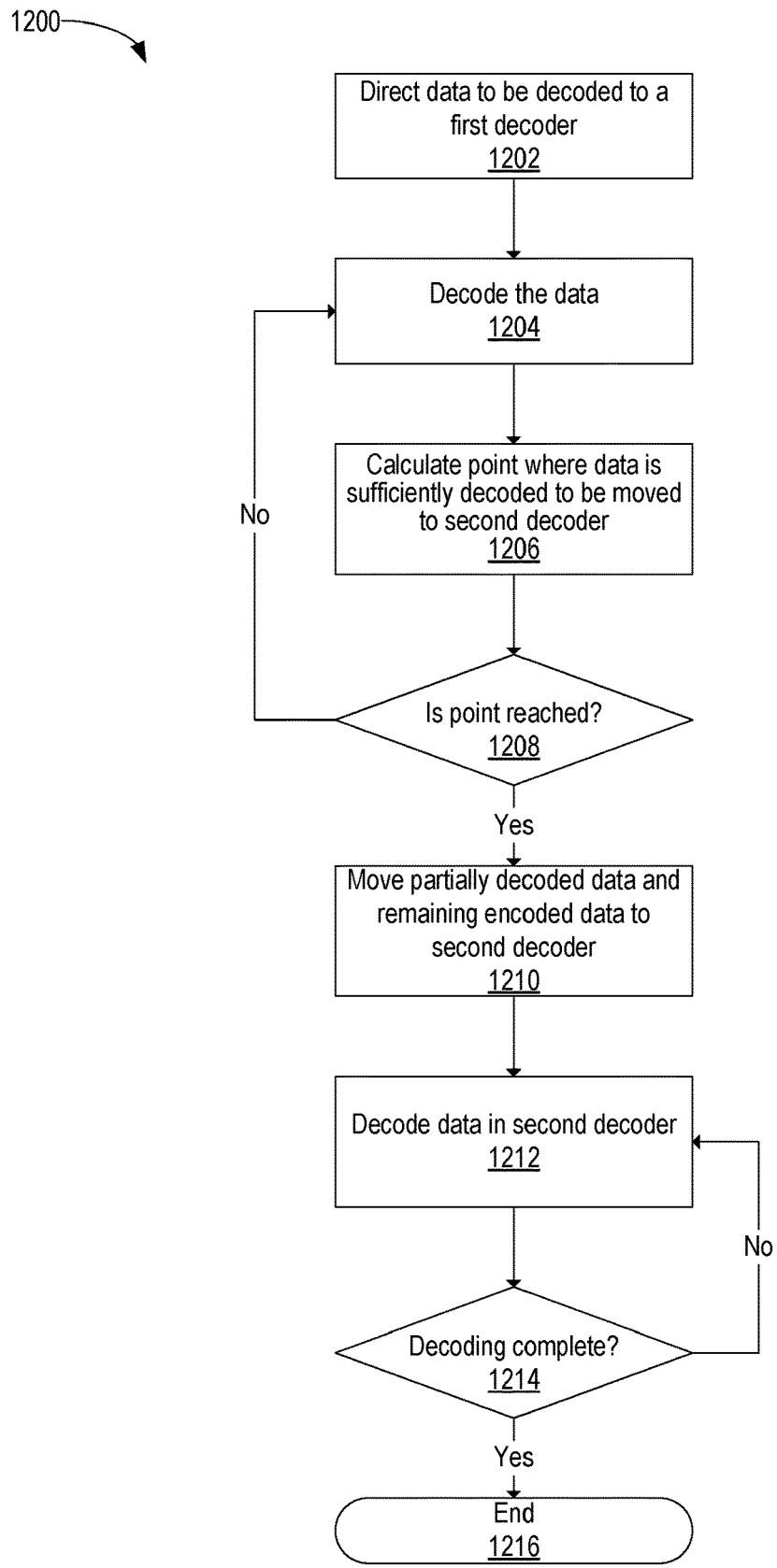
FIG. 12 is a flow chart illustrating a method for a ML based transition, according to certain embodiments.

FIG. 12 is a flow chart illustrating a method 1200 for a ML based transition, according to certain embodiments. The method 1200 begins at block 1202. At block 1202, the controller, such as the controller 202 of FIG. 2, directs data to be decoded to a first decoder, such as the first decoder 206 of FIG. 2. At block 1204, the first decoder decodes the data. At block 1206, the controller calculates the point where the data is sufficiently decoded to be moved to a second decoder such as the second decoder 208 of FIG. 2. At block 1208, the controller determines whether the point where the data is sufficiently decoded has been reached. If the controller determines that the point is not reached, then method 1200 returns to block 1204. If the controller determines that the point is reached, then the method 1200 proceeds to block 1210. At block 1210, the controller moves the partially decoded data and the remaining encoded data to the second decoder. At block 1212, the controller decodes the data in the second decoder. At block 1214, the controller determines whether the decoding is complete. If the controller determines that the decoding is not compete, then the method 1200 returns to block 1212. If the controller determines that the decoding is complete, then the method 1200 proceeds to block 1216 where the method 1200 ends.

Figure 13:
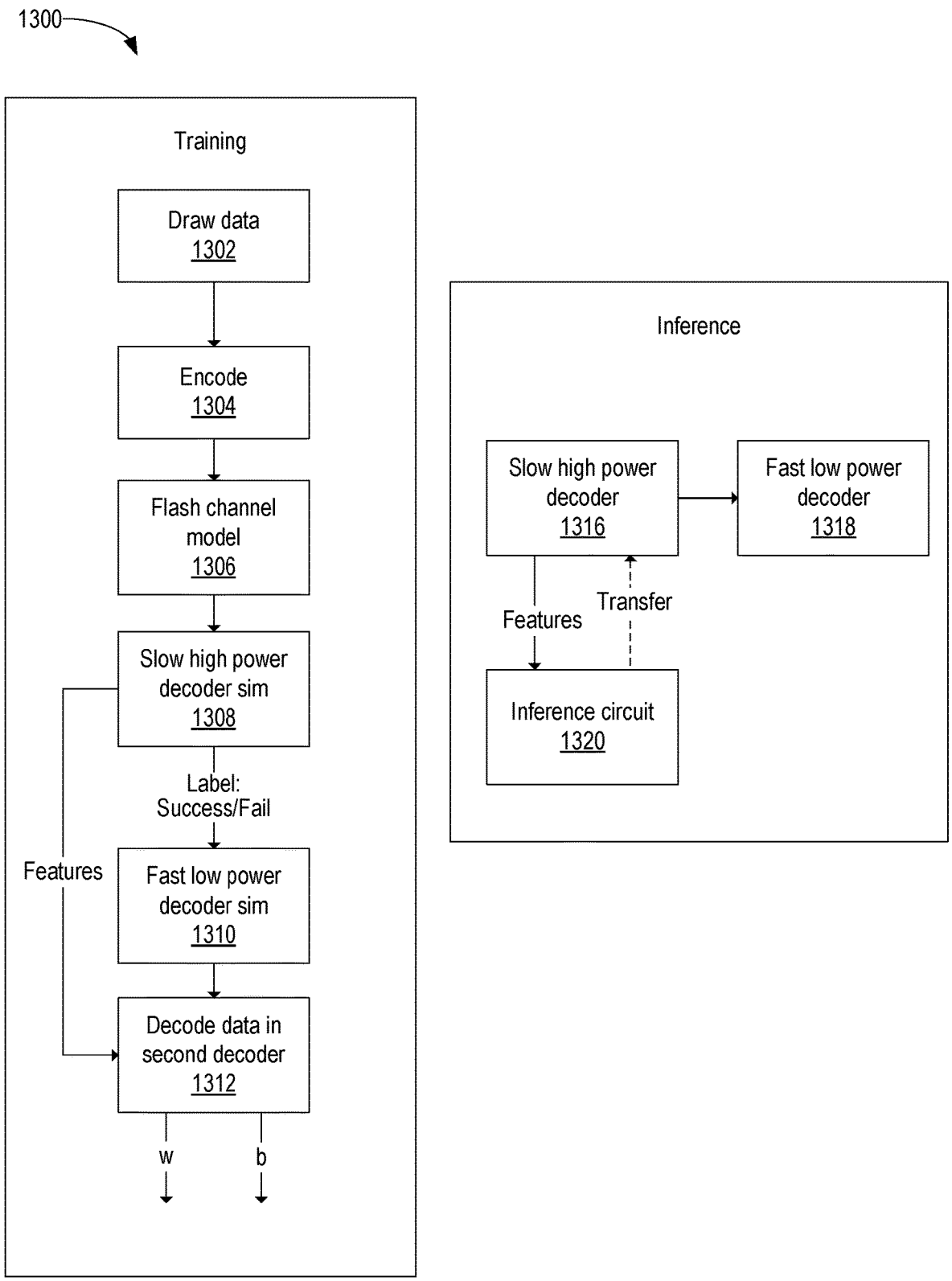
FIG. 13 is a flowchart illustrating a method for classification training and interference, according to certain embodiments.

FIG. 13 is a flowchart illustrating a method 1300 for classification training and interference, according to certain embodiments. The label used for training is whether the fast low power decoding can succeed in decoding a noisy code-word. In a use-case to minimize the false positive rate (at the expense of true positive rate) is beneficial. As mentioned, if the controller, such as the controller 202 of FIG. 2, transfers the codeword to the fast low power decoding and the fast low power decoding fails, a recovery flow will be triggered. The training cost function is then biased to choose a conservative working point where there observable false positives are minimized.

The method 1300 begins at block 1302 during ML training. At block 1302, data is drawn. At block 1304, the data is encoded. At block 1306, a flash channel model is created. At block 1308, a slow high power decoder simulation is run. The method 1300 can either proceed to block 1310 or block 1312. At block 1310, a fast low power decoder simulation is run. At block 1314, the data is decoded in a second decoder. The method 1300 continues at block 1316 in the inference. At block 1316, the data is decoded using the slow high power decoder. At block 1318, the data is decoded using a fast low power decoder. At block 1320, the inference circuit can either receive data through the use of features such as the simple features discussed above from the slow high power decoder at block 1316 or transfer data to the slow high power decoder at block 1316.

To improve the performance of the decoding system, the basic approach is to take the hard decisions from the second decoder and when transitioning use the soft information to initialize the first decoder.

In one embodiment, a controller comprises: a first decoder, wherein the first decoder operates at a first power efficiency level; a second decoder, wherein the second decoder operates at a second power efficiency level below the first power efficiency level; and a decoder manager coupled to the first decoder and the second decoder, wherein the decoder manager is configured to: direct encoded data to the first decoder for decoding; detect a point in the decoding where the data is sufficiently decoded to be able to be decoded by the second decoder; and direct the sufficiently decoded data to the second decoder. The detecting comprises performing a low complexity inference function using an inference circuit. The inference circuit includes a multiplier and an adder coupled to the multiplier. The inference circuit further includes an accumulator coupled to the adder. The decoder manager further includes a machine learning (ML) classifier. The ML classifier is trained to perform the detecting. The training occurs offline. The ML classifier is configured to determine a number of bit flips flipped by the first decoder in a backward looking window. The ML classifier is configured to determine a number of unsatisfied parity checks of the first decoder in a backward looking window.

In another embodiment, a controller comprises: a first decoder that operates at a first level; a second decoder that operates at a second level below the first level; and a decoder manager coupled to the first decoder and the second decoder, wherein the decoder manager is configured to: direct encoded data to the first decoder for partially decoding the data; and direct the partially decoded data to the second decoder. The decoder manager is further configured to calculate a syndrome weight (SW) of an encoded data. The decoder manager is further configured to compare the calculated SW to a threshold. The decoder manager is further configured to direct the partially decoded data to the second decoder after a predetermined period of time. The decoder manager is further configured to determine that the second decoder failed in decoding the partially decoded data. The decoder manager is further configured to send the partially decoded data back to the first decoder. The decoder manager is further configured to detect a point in decoding the encoded data in the first decoder where the partially decoded data can be sent to the second decoder.

In another embodiment, a controller comprises: first means to decode data at a first power efficiency level; second means to decode data at a second power efficiency level below the first power efficiency level; and a decoding manager coupled to the first means to decode data and the second means to decode data, wherein the decoding manager is configured to: obtain first decoding information from simulating decoding data in the first means to decode data; obtain second decoding information from simulating decoding data in the second means to decode data; deliver the first decoding information and the second decoding information to a classifier; and create classifier weight and bias based upon the delivering. Obtaining first decoding information, obtaining second decoding information, delivering, and creating occurs offline. The decoding manager is configured to determine a number of unsatisfied parity checks for the first means to decode data and the second means to decode data. The decoding manager is configured to deliver the classified weight and bias to an inference circuit.

While the foregoing is directed to embodiments of the present disclosure, other and further embodiments of the disclosure may be devised without departing from the basic scope thereof, and the scope thereof is determined by the claims that follow.

What is claimed is:

1. A controller, comprising:
   a first decoder, wherein the first decoder operates at a first power efficiency level;
   a second decoder, wherein the second decoder operates at a second power efficiency level above the first power efficiency level; and
   a decoder manager coupled to the first decoder and the second decoder, wherein the decoder manager comprises a machine learning (ML) classifier, the decoder manager is configured to:
      direct encoded data to the first decoder for decoding;
      decode, using the first decoder, the encoded data directed to the first decoder;
      during the decoding, calculate a point in the decoding where the encoded data is sufficiently decoded to be able to be decoded by the second decoder, wherein the point is not calculated prior to the decoding;
      determine whether the point has been reached by the first decoder;
      direct the sufficiently decoded data to the second decoder for decoding;
      determine whether the second decoder successfully decoded the sufficiently decoded data;
      trigger a recovery flow based on the determination that the second decoder did not successfully decode the sufficiently decoded data; and
      if the recovery flow is triggered, bias a conservative working point, wherein the conservative working point is more conservative than the point.

2. The controller of claim 1, wherein the calculating comprises performing a low complexity inference function using an inference circuit.

3. The controller of claim 2, wherein the inference circuit includes a multiplier and an adder coupled to the multiplier.

4. The controller of claim 3, wherein the inference circuit further includes an accumulator coupled to the adder.

5. The controller of claim 1, wherein the ML classifier is trained to perform the calculating, and wherein the training occurs offline.

6. The controller of claim 1, wherein calculating the point comprises determining a number of bit flips flipped by the first decoder in a backward looking window.

7. The controller of claim 6, wherein calculating the point comprises determining a number of unsatisfied parity checks of the first decoder in a backward looking window.

8. The controller of claim 1, wherein calculating the point comprises determining a number of log likelihood ratios (LLRs) of the first decoder whose magnitude exceed a threshold.

9. The controller of claim 1, wherein the sufficiently decoded data has a high probability for the second decoder to succeed after the point in the decoding.

10. A controller, comprising:
a first decoder that operates at a first level;
a second decoder that operates at a second level below the first level; and
a decoder manager coupled to the first decoder and the second decoder, wherein the decoder manager is configured to:
training a machine learning (ML) classifier, wherein the training comprises:
directing encoded data to a first decoder simulation to decode the encoded data;
decoding, using the first decoder simulation, the encoded data directed to the first decoder simulation;
during the decoding of the encoded data, calculating a point in the decoding where the encoded data is sufficiently decoded to be able to be decoded by a second decoder simulation, wherein the point is not calculated prior to the decoding of the encoded data;
determining whether the point has been reached by the first decoder simulation;
directing the sufficiently decoded data to the second decoder simulation; and
determining whether the second decoder simulation successfully decoded the sufficiently decoded data;
after determining the second decoder simulation failed to successfully decode the sufficiently decoded data, direct the sufficiently decoded data to the second decoder;
trigger a recovery flow based on the determination that the second decoder simulation did not successfully decode the sufficiently decoded data; and
if the recovery flow is triggered, bias a conservative working point, wherein the conservative working point is more conservative than the point.

11. The controller of claim 10, wherein the decoder manager is further configured to calculate a syndrome weight (SW) of the encoded data after or in parallel to directing the encoded data to the first decoder simulation.

12. The controller of claim 11, wherein the decoder manager is further configured to compare the calculated SW to a threshold.

13. The controller of claim 10, wherein the decoder manager is further configured to direct the sufficiently decoded data to the second decoder simulation after a predetermined period of time.

14. The controller of claim 10, wherein the decoder manager is further configured to send the sufficiently decoded data back to the first decoder.

15. The controller of claim 10, wherein the decoder manager is further configured to detect a point in decoding the encoded data in the first decoder simulation where the sufficiently decoded data can be sent to the second decoder.

16. A controller, comprising:
first means to decode data at a first power efficiency level;
second means to decode data at a second power efficiency level above the first power efficiency level; and
a decoding manager coupled to the first means to decode data and the second means to decode data, wherein the decoding manager is configured to:
obtain first decoding information from simulating a decoding of encoded data in the first means to decode data, wherein the obtaining comprises calculating a point during simulating the decoding of the encoded data in the first means to decode data, wherein the point indicates where the encoded data is sufficiently decoded to be able to be decoded by the second means to decode data;
simulating the decoding of the encoded data in the first means to decode data to the point;
directing the encoded data decoded to the point to the second means to decode data;
determining whether the second means to decode data successfully decoded the encoded data decoded to the point;
and
create classifier weight and bias based upon a consistency of the first decoding information and the determination whether the second means to decode data successfully decoded the encoded data decoded to the point.

17. The controller of claim 16, wherein obtaining first decoding information occurs offline.

18. The controller of claim 16, wherein the decoding manager is configured to determine a number of unsatisfied parity checks for the first means to decode data and the second means to decode data.

19. The controller of claim 16, wherein the decoding manager is configured to deliver the classified weight and bias to an inference circuit.

* * * * *